(12) United States Patent
Banerjee et al.

(10) Patent No.: US 10,796,308 B2
(45) Date of Patent: Oct. 6, 2020

(54) TRANSACTION TERMINAL BIOMETRIC INTEGRATION

(71) Applicant: NCR Corporation, Duluth, GA (US)

(72) Inventors: Somnath Banerjee, Alpharetta, GA (US); Robert Thomas Borucki, Scottsdale, AZ (US)

(73) Assignee: NCR Corporation, Atlanta, GA (US)

( * ) Notice: Subject to any disclaimer, the term of this patent is extended or adjusted under 35 U.S.C. 154(b) by 29 days.

(21) Appl. No.: 16/023,053

(22) Filed: Jun. 29, 2018

(65) Prior Publication Data
US 2020/0005318 A1  Jan. 2, 2020

(51) Int. Cl.
*G06F 21/32* (2013.01)
*G06Q 20/10* (2012.01)
*G06Q 20/18* (2012.01)
*G06Q 20/20* (2012.01)
*G06Q 20/40* (2012.01)

(52) U.S. Cl.
CPC ....... *G06Q 20/40145* (2013.01); *G06F 21/32* (2013.01); *G06Q 20/1085* (2013.01); *G06Q 20/18* (2013.01); *G06Q 20/206* (2013.01); *G06F 2221/2117* (2013.01)

(58) Field of Classification Search
CPC ............................................... G06Q 20/40145
See application file for complete search history.

(56) References Cited

U.S. PATENT DOCUMENTS

| | | | | |
|---|---|---|---|---|
| 6,618,806 B1* | 9/2003 | Brown | ............. | G06F 21/32 709/225 |
| 8,571,902 B1* | 10/2013 | Glavan | ............. | G06Q 10/02 705/325 |
| 2004/0187009 A1* | 9/2004 | Ebata | ............. | H04L 67/02 713/185 |
| 2008/0008173 A1* | 1/2008 | Kanevsky | ............. | H04L 45/00 370/389 |
| 2015/0350200 A1* | 12/2015 | Li | ............. | H04L 63/0861 726/8 |
| 2018/0165655 A1* | 6/2018 | Marcelle | ............. | G06Q 10/1095 |
| 2019/0139017 A1* | 5/2019 | Malinofsky | ............. | G06Q 10/02 |

OTHER PUBLICATIONS

Soares, et al., 2016, in "Fingerprint and Iris Biometric Controlled Smart Banking Machine Embedded with GSM Technology for OTP" (Year: 2016).*

* cited by examiner

*Primary Examiner* — Olabode Akintola
*Assistant Examiner* — Brandon M Duck
(74) *Attorney, Agent, or Firm* — Schwegman, Lundberg & Woessner

(57) ABSTRACT

A transaction terminal includes a plurality of disparate application services that process within a common/shared platform on the transaction terminal. Each disparate application service may include its own unique biometric provider for providing biometric registration and recognition services to customers at the transaction terminal. When a particular application service is launched for execution on the transaction terminal, a biometric integration manager identifies an appropriate biometric provider for that application service and interacts with that biometric provider and the launched application service to facilitate biometric registration or biometric recognition of a customer transacting at the transaction terminal.

2 Claims, 4 Drawing Sheets

TRANSACTION TERMINAL BIOMETRIC INTEGRATION

BACKGROUND

Face biometric identification and authentication of passengers during the check-in process is picking up rapidly across the globe. However, today no one is doing face biometric authentication for multiple airlines on a Common Use Self-Service (CUSS) kiosk.

Airlines and airports across the globe use CUSS kiosks for passenger check-in. These kiosks are those which host multiple airline check-in applications. Also, most of the airlines want to use face identification in their check-in process for obvious security and ease of use reasons. However, there is no travel solution vendor in the market today who can run a face recognition process flow on a CUSS kiosk. In addition, face recognition is not yet a mature technology.

However, enterprises and airlines are all considering biometric authentication approaches. The problem is that each enterprise is considering its own solution but when multiple enterprises operate on a same platform using custom Application Programming Interfaces (APIs), there is no practical mechanism available for each enterprise to maintain its own solution while still properly execution in a shared platform environment. Substantial revisions to the platform appears the only mechanism by which each enterprise can elect their own biometric solution and continue to have their services available within the common platform. Furthermore, such an approach would also require substantial modifications to the existing APIs and each of the enterprises' service offerings.

As a result, enterprises that do offer biometric solutions are providing such solutions in a limited fashion that is reserved for the hardware that they control and that is not available on hardware platforms that enterprises share with one another. Most enterprises do not want to maintain and support their own hardware especially when the services provided by such enterprises are not related to any hardware.

SUMMARY

In various embodiments, methods and a system for transaction terminal biometric integration are presented.

According to an embodiment, a method for shared platform biometric integration is presented. Specifically, and in one embodiment, a biometric operation is received from an application processing on a transaction terminal with a plurality of other applications within a shared platform on the transaction terminal. Processing control on the transaction terminal is passed to a biometric provider associated with the application in response to the received biometric operation. A result produced by the biometric provider after processing the biometric operation is provided back to the application.

DETAILED DESCRIPTION

Figure 1:
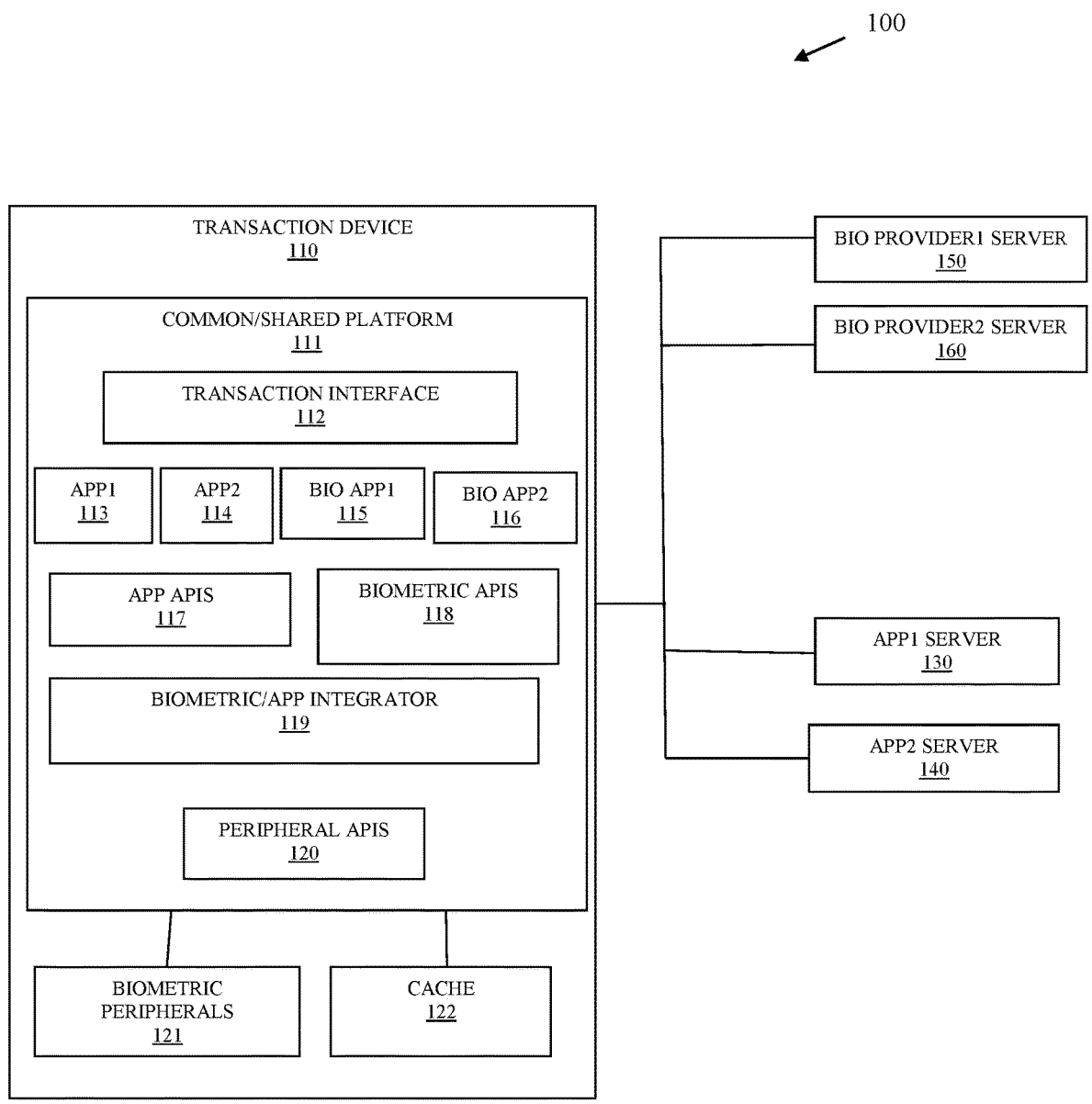
FIG. 1 is a diagram of a system for transaction terminal biometric integration processing, according to an example embodiment.

FIG. 1 is a diagram of a system 100 for transaction terminal biometric integration processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of a shared platform on a transaction terminal for biometric integration processing, presented herein and below.

The system 100 includes a transaction device 110 (hereinafter just "device 110"). The device 110 including: a common shared platform 111, at least two third-party applications (app1 113 and app2 114), at least two biometric (bio) apps (bio app1 115 and bio app2 116), application (app) APIs 117, biometric APIs 118, a biometric/app integrator 119, and peripheral APIs 120. The device 110 further including biometric peripherals 121 and cache 122. It is to be noted that although not illustrated in the FIG. 1, the device also includes one or more hardware processors, volatile and non-volatile memory, non-volatile storage, and networking circuitry (such as wired ports and wireless transceivers).

The system 100 further includes corresponding servers that are networked interfaced to the device 110, such as app1 server 130 (corresponding to the app1 113) and app2 server 140 (corresponding to the app2 114). The system also includes a plurality of interfaced biometric servers, such as bio provider1 150 and bio provider2 160.

It is to be noted that although the system only illustrates two apps (113 and 114) and two bio apps (115 and 116), embodiments of the invention are not limited to just two of these components.

The common/shared platform 111 represents a logical processing environment on the transaction device 110 for which the apps (113-116) share common hardware (processor, memory, storage), the peripherals (printer, display, touchscreen, keyboard, card reader, scanner, camera, video camera, media acceptor, media dispenser, microphone, speaker, etc.) including the biometric peripherals 110A (camera, video camera, optional fingerprint reader, microphone, retina scanner, infrared sensor, etc.).

In an embodiment, the common/shared platform 111 is an existing shared platform 111 for CUSS kiosks enhanced to provide retailer-driven and specific biometric authentication processing within the workflows of the retailer-based services from the enhanced common/shared platform 111 on the CUSS kiosks.

It is also to be noted that non-biometric peripherals are part of the device 110 and shared in the common/shared platform 111 by the apps (113-116) even though only biometric peripherals 110A are illustrated in the FIG. 1.

There are two main processing flows for the system 110 as a whole during operation. A biometric registration processing flow and a non-registration with bio recognition processing flow.

During registration, the processing of the components for the system 100 proceed as follows. A user that desires to transact at the device 110 selects a third-party app (113 or 114) for performing a transaction on and at the device 110. The selection is made from the transaction interface 112 that displays selections for the apps 113 and 114 for conducting a user-initiated transaction. Based on a selection, the corresponding selected app 113 or 114 is initiated for processing within the common/shared platform 111 by the transaction interface 112.

The selected app 113 or 114 is provided control of the device peripherals through the app APIs 115. The selected app 113 or 114 controls the display screens on the display peripheral of the device 110. A display screen asks the user how the user would like to be identified, such as through a card, manual entry, or biometric means. The user selects biometric means. The app 113 or 114 includes its own biometric third-party provider, which may be different or the same as a biometric third-party provider of the remaining app 113 or 114 that processes within the common/shared platform 111.

Based on the selection of the biometric means, the selected app 113 or 114 provides control to the biometric/app integrator 119. The biometric/app integrator 119 based on the calling app 113 or 114 initiates communication with the corresponding bio app 115 or 116 associated or linked to the app 113 or 114 identifying a registration session for biometric recognition of the user. The bio app 115 or 116 is given control of the biometric peripherals 110A through the biometric APIs 116. This initiates the biometric registration for the user on the device 110.

During registration, the bio apps 115 or 116 may interact with the user through the display, microphone, and/or speakers to provide feedback to the user as to what is needed of the user. For example, remove your hat, remove your sunglasses, center your face on the screen, etc. The biometric peripherals 121 are accessed to capture biometric readings from the user. Such readings, can include images of the user's face, audio of the user's voice, images of the user's fingerprint, and images of the user's retina. The biometric captured data (readings) that are captured from the peripherals 121 and provided to the bio app 115 or 116. The bio app 115 or 116 calculates the biometric measurements and generates a template for the measurements that uniquely identify the user, and the bio app 115 or 116 assigns a template identifier (ID) for the template.

Also during registration interface screens provided by the app 113 or 114 and/or the bio app 115 or 116 collects the user's identifying information (name, loyalty number, account number, birthdate, etc.) for the biometric registration. Once the template ID and template are resolved by the bio app 115 or 116. The biometric/app integrator 119 records the template ID and template and uses the app APIs to provide the user's identifying information and the template ID back to the app 113 or 114. Control is then passed back to the app 113 or 114 for processing the user's transaction following the registration. The app 113 or 114 records the template ID in an account record for the user based on the user's identifying information.

During a non-registration and bio recognition processing flow, the user selects an app 113 or 114 from the transaction initiation screen controlled by the transaction interface 112. The transaction interface 112 passes control to the app 113 or 114. The user selects a "recognize me" option from the display provided by the app 113 or 114. The app 113 or 114 returns control to the biometric/app integrator 119 in response to the selection of the "recognize me option" made by the user.

The biometric/app integrator 119 identifies the bio app 115 or 116 associated with the calling app 113 or 114 and gives control to that bio app 115 or 116. The bio app 115 or 116 accesses the biometric peripherals 121 using the peripheral APIs 120 and matches biometric features of the user from the biometric data captured by the peripherals 121 to a template. The bio app 115 or 116 provides the associated or linked template ID to the biometric/app integrator 119 through the biometric APIs 118. The biometric/app integrator 119 uses the app APIs 117 to provide the app 113 or 114 the template id. The template id is linked to the identity of the user in the account database for the app at the app server 130 or 140. So, the app 113 or 114 provides the template id to its corresponding server service and the app 113 or 114 and the app server 130 or 140 interact with the user at the transaction device 110 for the transaction with the user identified through biometric authentication using a biometric provider preferred by the entity associated with the app 113 or 114.

The bio provider servers 150 and 160 maintain the bio apps 115 and 116 on the device 110 to ensure they are updated and patched as needed and provide two-way networked communications between the apps 115 and 116 and the servers 150 and 160.

In an embodiment, the transaction device is a CUSS kiosk for airlines situated at an airport. The biometric/app integrator 119 maintains template IDs and templates generated by the bio apps 115 and 116 and the transaction interface 112 is interfaced to the airline reservation system. Such, that at the beginning of each day or some other configured interval or time, the biometric/app integrator 119 pre-populates the cache 122 of the device 110 with known customers that are scheduled for flights at the airport. This can be done by obtaining the flight manifest for the day using the app APIs 117 to contact the app servers 130 and 140 with passenger information and obtaining from the app servers 130 and 140 the template IDS for those passengers scheduled for a flight that day. The templates matching those template IDS are then pre-populated in cache and made available to the corresponding bio apps 115 and 116 to expedite bio recognition processing by those bio apps 115 and 116 when the customers appear at the device 110 for a check-in transaction with the airlines.

In an embodiment, the biometric/app integrator 119 stores the template IDs and corresponding linked templates with a remote server, such that multiple different devices 110 can share and keep up-to-date template information for registered bio customers.

In an embodiment, the bio apps 115 or 116 can provide authentication and recognition of documents presented by a user at the device 110, such as passports or other government-issued documents.

In an embodiment, the bio apps 115 or 116 use a photograph of the customers for a government-issued identification document as the template and the customer provides the government-issued identification document during a registration session through the biometric peripherals.

In an embodiment, the bio apps 115 and 116 need not process within the common/shared platform 111 or execute on the hardware of the device 110; rather, the apps 115 and 116 remotely execute on the servers 150 and 160 and remotely interact with the biometric/app integrator 119 using the biometric APIs 118 with the biometric/app integrator 119 acting as a proxy for the apps 115 and 116 in executing instructions on the device 110 and in providing bio metric captured data and user feedback information back to the apps 115 or 116.

In an embodiment, the APIs 117 and 118 and the biometric/app integrator 119 represent a middleware software layer added to the common/shared platform 111 to provide the biometric registration and recognition processing described herein. In an embodiment, the middleware software layer is provided as a biometric application integrator within an enhanced Travel Client Services® (TCS®) middleware product that is distributed by NCR, Inc.

In an embodiment, the biometric peripherals 121 include a camera and/or a video camera.

In an embodiment, the biometric peripherals 121 include one or more of: a camera, a video camera, a fingerprint reader, a retina scanner, and a microphone.

In an embodiment, the template (biometric template) is a template having biometric measurements with respect to one or more of: a user's face, a user's eye, a user's finger or multiple digits of the user, and a voice pattern of the user.

In an embodiment, the transaction device 110 is a CUSS kiosk.

In an embodiment, the transaction device 110 is one of an airline, lodging, entertainment, or restaurant kiosk.

In an embodiment, the transaction device 110 is an Automated Teller Machine (ATM).

In an embodiment, the transaction device 110 is a Point-Of-Sale (POS) device.

These and other embodiments are now discussed with reference to the FIGS. 2-4.

One now appreciates how multiple disparate entities that share a same common service-delivery platform can deploy the common/shared platform 111 with the APIs 117 and 118 and the biometric/app integrator 119 with minimal modifications to existing applications of those enterprises for purposes of providing user biometric registration and recognition/authentication services utilizing applications 113 and 114 deployed in the platform 111, such that each entity can select its own preferred and desired bio app 115 and 116. The bio apps 115 and 116 may be provided within the platform 111 or provided remotely from servers 150 and 160. Such processing was previously unavailable in the industry and has thwarted biometric services being offered to customers of the entities. This also enhances the device 110 by providing new feature/function to the device 110 that was previously unavailable in the industry on existing transaction devices (kiosks, ATMs, POS terminals).

These and other embodiments are now discussed with reference to the FIGS. 2-4.

Figure 2:
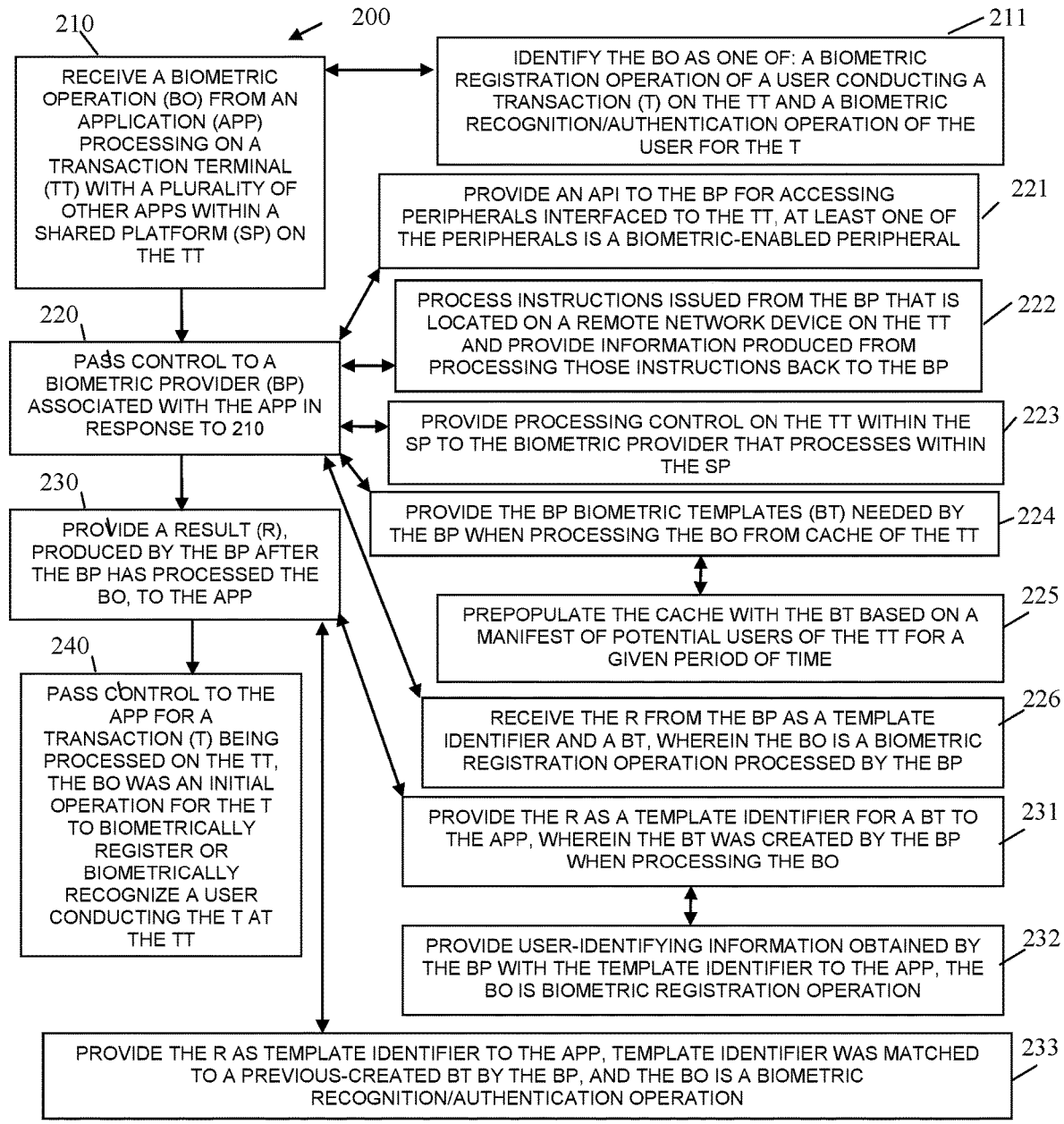
FIG. 2 is a diagram of a method for shared platform biometric integration, according to an example embodiment.

FIG. 2 is a diagram of a method 200 for shared platform biometric integration, according to an example embodiment. The software module(s) that implements the method 200 is referred to as a "biometric integrator." The biometric integrator is implemented as executable instructions programmed and residing within memory and/or a non-transitory computer-readable (processor-readable) storage medium and executed by one or more processors of a device. The processor(s) of the device that executes the biometric integrator are specifically configured and programmed to process the biometric integrator. The biometric integrator has access to one or more network connections during its processing. The network connections can be wired, wireless, or a combination of wired and wireless.

In an embodiment, the device that executes the biometric integrator is the device 110. In an embodiment, the device 110 is one of: a CUSS kiosk, an ATM, a travel/lodging/entertainment/restaurant kiosk, and a POS terminal.

In an embodiment, the biometric integrator is the biometric integrator 119.

At 210, the biometric integrator receives a biometric operation from an application processing on a transaction terminal with a plurality of other applications within a shared platform processing environment. In an embodiment the application and other applications are apps 113 and 114, and the shared platform is the common/shared platform 111.

In an embodiment, at 211, the biometric integrator identifies the biometric operation as one of: a biometric registration operation of a user conducting a transaction on the transaction terminal and a biometric recognition operation of the user for the transaction.

At 220, the biometric integrator passes control to a biometric provider associated with the application (app) in response to receiving the biometric operation at 210. In an embodiment, the biometric provider is one of biometric apps 115 and 116.

In an embodiment, at 221, the biometric integrator provides an API to the biometric provider for accessing peripherals interfaced to the transaction terminal; at least one of the peripherals is a biometric-enabled peripheral. In an embodiment, the biometric-enabled peripheral is one of: a camera, a video camera, a microphone, fingerprint reader, and a retina scanner.

In an embodiment, at 222, the biometric integrator process instructions issued from the biometric provider. The biometric provider processes on a remote network device that is remotely available to the transaction terminal over a network connection. The biometric integrator processes the instructions on the transaction terminal provided by the biometric provider and provides back to the biometric provider information produced from processing the instructions. Here, the biometric provider executes on one of the servers 150 or 160 and the biometric integrator acts as a proxy for the biometric provider.

In an embodiment, at 223, the biometric integrator provides processing control on the transaction terminal within the shared platform to the biometric provider within the shared platform. In an embodiment, the processing control is exclusive processing control of the transaction terminal for the biometric provider to process the biometric operation.

In an embodiment, at 224, the biometric integrator provides the biometric provider with biometric templates needed by the biometric provider when the biometric provider processes the biometric operation. The templates are provided from cache of the transaction terminal. In an embodiment, the cache is cache 122.

In an embodiment of 224 and at 225, the biometric integrator prepopulates the cache with the biometric templates based on a manifest of potential users of the transaction terminal for a given period of time. This embodiment was discussed above with FIG. 1 in the context of an airline kiosk and a passenger manifest.

In an embodiment, at 226, the biometric integrator receives the result from the biometric provider as a template identifier and a biometric template. The biometric operation is a biometric registration operation processed by the biometric provider within the shared platform.

At 230, the biometric integrator provides a result produced by the biometric provider after the biometric provider has processed the biometric operation to the application.

In an embodiment, at 231, the biometric integrator provides the result as a template identifier for a biometric template to the application. The biometric template was created by the biometric provider when processing the biometric operation.

In an embodiment of 231 and at 232, the biometric integrator provides user-identifying information obtained by the biometric provider with the template identifier to the application. The biometric operation is a biometric registration operations.

In an embodiment, at 233, the biometric integrator provides the result as a template identifier to the application. The template identifier was matched to a previous-created biometric template by the biometric provider and the biometric operation is a biometric recognition/authentication operation.

According to an embodiment, at 240, the biometric integrator passes control to the application for a transaction being processed on the transaction terminal. The biometric operation was an initial operation for the transaction to biometrically register or biometrically recognize/authenticate a user conducting the transaction at the transaction terminal.

Figure 3:
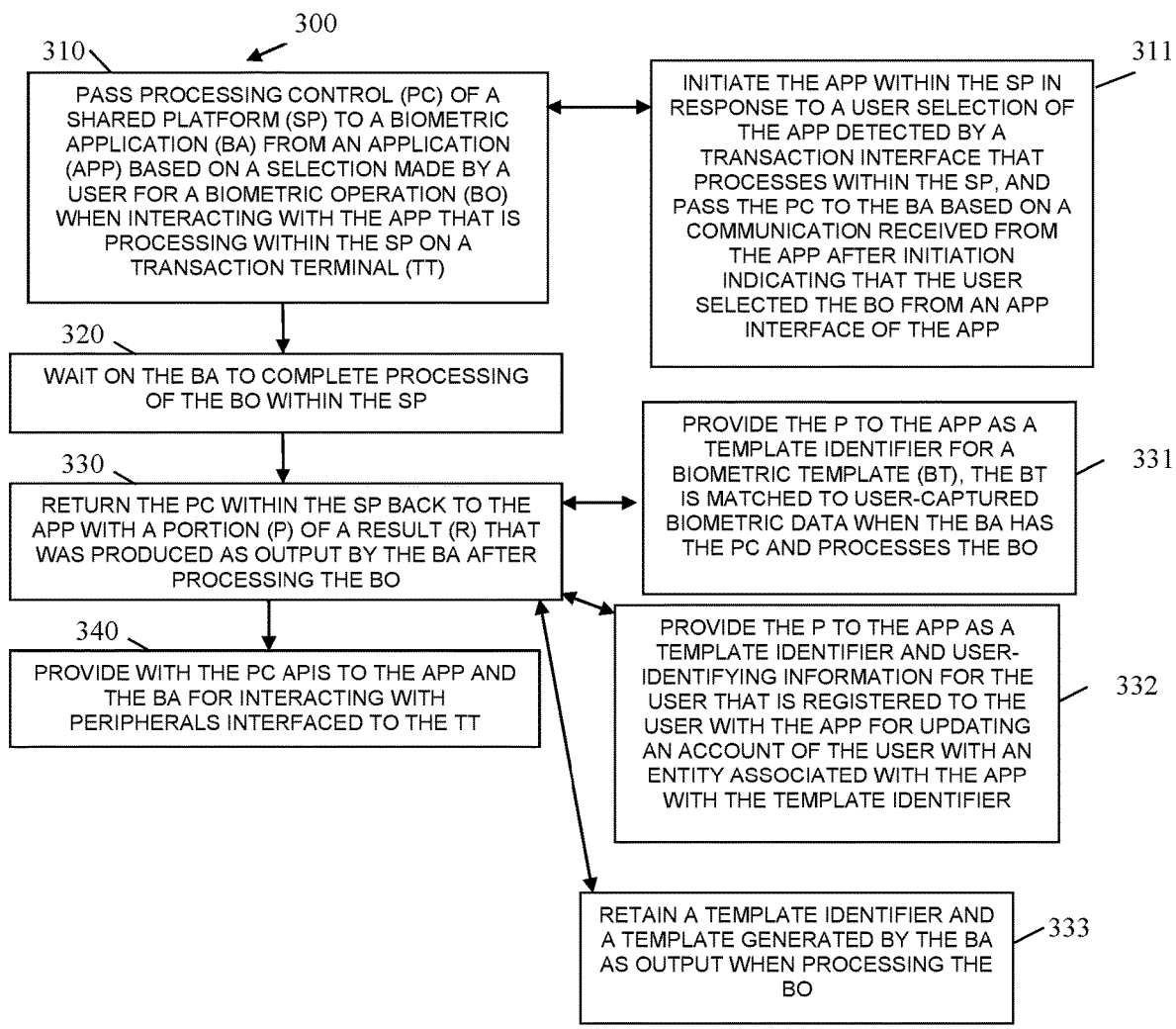
FIG. 3 is a diagram of another method for shared platform biometric integration, according to an example embodiment.

FIG. 3 is a diagram of another method 300 for shared platform biometric integration, according to an example embodiment. The software module(s) that implements the method 300 is referred to as a "biometric integration manager." The biometric integration manager is implemented as executable instructions programmed and residing within memory and/or a non-transitory computer-readable (processor-readable) storage medium and executed by one or more processors of a device. The processors that execute the biometric integration manager are specifically configured and programmed to process the biometric integration manager. The biometric integration manager has access to one or more network connections during its processing. The network connections can be wired, wireless, or a combination of wired and wireless.

In an embodiment, the device that executes the biometric integration manager is the device 110. In an embodiment, the device 110 is one of: a CUSS kiosk, an ATM, a travel/lodging/entertainment/restaurant kiosk, and a POS terminal.

In an embodiment, the biometric integration manager is all of or some combination of the biometric integrator 119 and/or the method 200.

The biometric integration manager presents another and in some ways enhanced processing perspective of the method 200.

At 310, the biometric integration manager passes processing control of a shared platform to a biometric application from an application based on a selection made by a user for a biometric operation when interacting with the application. The application also processing within the shared platform on the transaction terminal.

In an embodiment, at 311, the biometric integration manager initiates the application within the shared platform in response to a user selection of the application that is detected by a transaction interface that processes within the shared platform. The processing control is passed to the biometric application based on a communication received from the application after initiation indicating that the user selected the biometric operation from an application interface of the application.

At 320, the biometric integration manager waits or idles waiting for the biometric application to complete processing of the biometric operation within the shared platform.

At 330, the biometric integration manager returns the processing control within the shared platform back to the application with a portion of a result that was produced as output by the biometric application after processing the biometric operation.

In an embodiment, at 331, the biometric integration manager provides the portion of the result to the application as a template identifier for a biometric template. The biometric template is matched to user-captured data when the biometric application has the processing control and processes the biometric operation.

In an embodiment, at 332, the biometric integration manager provides the portion of the result to the application as a template identifier and user-identifying information for the user that is registered to the user with the application for updating an account of the user with an entity associated with the application with the template identifier. That is, registered user-identifying information for the user with the entity recorded in an account record is updated to include the template identifier as a portion of that user-identifying information.

In an embodiment, at 333, the biometric integration manager retains the template identifier and a biometric template generated by the biometric application as output when processing the biometric operation. No user-identifying information is retained; rather, just a template identifier and a biometric template linked to the template identifier is retained. In an embodiment, the template identifier and template are remotely retained by a server service interfaced to the biometric integration manager.

According to an embodiment, at 340, the biometric integration manager provides with the processing control APIs to the application and the biometric application for interacting with peripherals interfaced to the transaction terminal.

Figure 4:
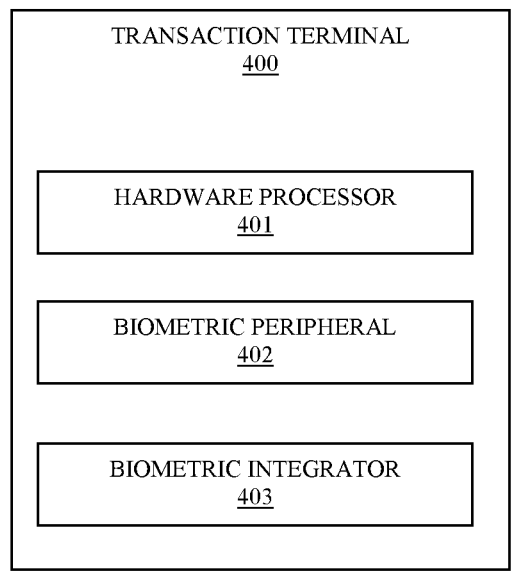
FIG. 4 is a diagram of a transaction terminal for shared platform biometric integration processing, according to an example embodiment.

FIG. 4 is a diagram of a transaction terminal 400 for shared platform biometric integration processing, according to an example embodiment. The transaction terminal 400 includes a variety of hardware components and software components. The software components of the transaction terminal 400 are programmed and reside within memory and/or a non-transitory computer-readable medium and execute on one or more processors of the transaction terminal 400. The transaction terminal 400 communicates over one or more networks, which can be wired, wireless, or a combination of wired and wireless.

In an embodiment, the transaction terminal 400 implements, inter alia, the processing described above with the FIGS. 1-3.

The transaction terminal 400 is the device 110. In an embodiment, the device 110 is a CUSS kiosk, an ATM, a travel/lodging/entertainment/restaurant kiosk, or a POS terminal.

The transaction terminal 400 includes at least one hardware processor 401, one or more biometric peripherals 402, and a biometric integrator 403.

In an embodiment, the biometric integrator 403 is all or some combination of: the biometric integrator 119, the method 200, and/or the method 300.

The biometric integrator 403 is executable instructions that execute from a non-transitory computer-readable medium on the hardware processor 401.

The biometric integrator 403 is configured to: i) process within a shared platform on the transaction terminal 400 with a plurality of applications and a plurality of biometric applications, iii) selective pass processing control to and from the applications to the biometric applications, iv) provide APIs for the applications and biometric applications to interact with the at least one biometric peripheral 402 of the transaction terminal 400 when the applications and biometric applications have the processing control, and v)

provide portions of output produced by the biometric applications when transferring processing control from the biometric applications to the applications to facilitate one of: registering users for biometric recognition with the applications and biometrically recognizing/authenticating the users for accessing accounts of the users held by entities associated with the applications It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A transaction terminal, comprising:
a hardware processor configured to execute executable instructions from a non-transitory computer-readable storage medium as a biometric integrator;
at least one biometric peripheral interfaced to the transaction terminal; and
the biometric integrator configured to: i) execute on the hardware processor and manage a processing control that is provided to access the transaction terminal between a plurality of applications and a plurality of biometric applications, ii) process within a shared platform on the transaction terminal with the plurality of applications and the plurality of biometric applications, iii) selectively pass the processing control on the transaction terminal to and from the applications to the biometric applications, and ensure that only a particular application or a particular biometric application has the processing control at any given point in time, and determine each biometric application based on a specific application, iv) provide Application Programming Interfaces (APIs) for the applications and biometric applications to interact with the at least one biometric peripheral of the transaction terminal when the applications and biometric applications have the processing control, and v) provide portions of output produced by the biometric applications when transferring the processing control from the biometric applications to the applications to facilitate one of:
registering users for biometric recognition with the applications and biometrically recognizing/authenticating the users for accessing accounts of the users held by entities associated with the applications.

2. The transaction terminal of claim 1, wherein the transaction terminal is one of a Common Use Self-Service (CUSS) kiosk, an Automated Teller Machine (ATM), a travel/lodging/entertainment/restaurant kiosk, and a Point-Of-Sale (POS) terminal.

\* \* \* \* \*